United States Patent
Minkow et al.

(10) Patent No.: US 6,244,655 B1
(45) Date of Patent: Jun. 12, 2001

(54) BICYCLE SADDLE WITH CUT OUT

(75) Inventors: Roger Minkow, Petaluma; Lance J. Bohlen, Morgan Hill; Robert F. Egger, Watsonville, all of CA (US)

(73) Assignee: Specialized Bicycle Components, Inc., Morgan Hill, CA (US)

( * ) Notice: Subject to any disclaimer, the term of this patent is extended or adjusted under 35 U.S.C. 154(b) by 0 days.

(21) Appl. No.: 09/583,348

(22) Filed: May 31, 2000

Related U.S. Application Data

(63) Continuation of application No. 09/452,546, filed on Dec. 1, 1999, now Pat. No. 6,106,059, which is a continuation of application No. 09/172,738, filed on Oct. 14, 1998, now abandoned.
(60) Provisional application No. 60/062,979, filed on Oct. 18, 1997.

(51) Int. Cl.[7] .......................................................... B62J 1/00
(52) U.S. Cl. ...................... 297/202; 297/214; 297/215.16
(58) Field of Search .................................... 297/202, 214, 297/215.16

(56) References Cited

U.S. PATENT DOCUMENTS

| | | |
|---|---|---|
| 282,219 | 4/1883 | Persons . |
| D. 282,219 | 1/1986 | Persons . |
| D. 407,910 | 4/1999 | Terry . |
| 574,503 | 1/1897 | Van Meter . |
| 576,310 | 2/1897 | Henderson . |
| 581,464 | 4/1897 | Hollenbeck . |
| 594,451 | 5/1897 | Wheeler . |
| 615,077 | 11/1898 | Lovekin . |
| 630,911 | 8/1899 | Moore . |
| 823,915 | 6/1906 | Brooks et al. . |
| 2,770,287 | 11/1956 | Christensen . |
| 3,185,522 | 5/1965 | Faulhaber . |
| 3,708,201 | 1/1973 | Lamkemeyer . |
| 3,815,953 | 6/1974 | Worley . |
| 4,218,090 | 8/1980 | Hoffacker et al. . |
| 4,572,575 | 2/1986 | Golden et al. . |
| 4,662,677 | 5/1987 | Hughes . |
| 4,768,826 | 9/1988 | Kashima . |
| 4,850,643 | 7/1989 | Rollman . |
| 4,898,422 | 2/1990 | West, III . |
| 4,952,439 | 8/1990 | Hanson . |
| 5,011,222 | 4/1991 | Yates . |
| 5,048,891 | 9/1991 | Yach . |
| 5,074,618 | 12/1991 | Ballard . |

(List continued on next page.)

FOREIGN PATENT DOCUMENTS

| | | |
|---|---|---|
| 415509 | 9/1994 | (DE) . |
| 94 15 509 U | 9/1994 | (DE) . |
| WO 88/09738 | 12/1988 | (EP) . |
| 0 603 138 | 3/1993 | (EP) . |
| 0603138 | 3/1993 | (EP) . |
| 2 324 989 | 11/1988 | (GB) . |
| 2 324 989 | 11/1998 | (GB) . |
| 0056138 | 5/1991 | (IT) . |
| WO 88/09738 | 12/1988 | (WO) . |
| WO 88/9738 | 12/1988 | (WO) . |
| WO 98/25810 | 6/1998 | (WO) . |
| WO 98/31584 | 6/1998 | (WO) . |
| WO 88/09738 | 12/1998 | (WO) . |

OTHER PUBLICATIONS

The Aero Bicycle Saddle, "Aero Saddle," Sep. 18, 1998, http.//www.world–net/usersdrwest/, pp 2 pgs total.
FlatBack Technologies, Inc. "The Cheat–A–Post," Sep. 18, 1998, http./www/flatbacktech.com/pp 2 pgs. Total.

(List continued on next page.)

Primary Examiner—Anthony D. Barfield
(74) Attorney, Agent, or Firm—Knobbe, Martens, Olson & Bear, LLP

(57) ABSTRACT

A bicycle seat with a base having a front which broadens towards a rear that has a notched groove. A connector is attached to the base.

19 Claims, 6 Drawing Sheets

U.S. PATENT DOCUMENTS

| | | |
|---|---|---|
| 5,076,642 | 12/1991 | Beylet et al. . |
| 5,108,076 | 4/1992 | Chiarella . |
| 5,165,752 | 11/1992 | Terry . |
| 5,203,607 | 4/1993 | Landi . |
| 5,286,082 | 2/1994 | Hanson . |
| 5,356,185 | 10/1994 | Hughes . |
| 5,356,205 | 10/1994 | Calvert . |
| 5,362,128 | 11/1994 | Bontrager . |
| 5,387,024 | 2/1995 | Bigolin . |
| 5,388,887 | 2/1995 | Read . |
| 5,395,155 | 3/1995 | Yach . |
| 5,524,961 | 6/1996 | Howard . |
| 5,636,896 | 6/1997 | Howard . |
| 5,645,315 | 7/1997 | Walker . |
| 5,714,108 | 2/1998 | Girardi et al. . |
| 5,720,516 | 2/1998 | Harrison . |
| 5,765,912 | 6/1998 | Bontrager . |
| 5,863,094 | 1/1999 | Endo . |
| 5,873,626 | 2/1999 | Katz . |
| 5,904,395 | 5/1999 | Yales . |
| 5,911,474 | 6/1999 | Lee . |
| 5,911,475 | 6/1999 | Nakahara . |
| 5,918,931 | 7/1999 | Cubertson . |

OTHER PUBLICATIONS

International Search Report, PCT/US98/21989, 6 pages.
Specialized Smart Products Catalog 1999, pp. 90, (Released at Interbike Trade Show in Las Vegas on Sep. 11, 1988).
Savage Bicycle Design L.C., "No Pain . . . No Gain . . . ? NOT," pp. 165, Interbike Directory, 1998.
"USA" Vuelta Expands Offerings, Bike Pulse Bicycle Product and Industry Trends, Sep. 1998, vol. 2, No. 9 pp. 28–29.
American Magazine "Bicyclist" published in Nov. of 1989 with reference to the figure of a "Hobson" seat on right bottom corner of magazine.
American Magazine "Bicyclist" published in Nov. of 1988; seat on p. 24.
"BDS" Magazine published in Apr. of 1988, p. 26; seat labeled "Personally tailored to your riding preference with a removable horn and adjustable seat pads which sepate."
"Bicicletta" Magazine published in 1998, a seat illustrated on p. 157.
American Bicyclist & Motorcyclist/Nov. 1989, p. 32, "The Hobson".
American Bicyclist & Motorcyclist/Nov. 1988, p. 24, "The Seat".
Bicycle Dealer Showcase/Apr. 1988, p. 26 "The Hobson".
Bicicletta/1992, p. 157 "Solle Besseno".
FlatBack Technologies, Inc. "The Cheat–A–Post. TM., " Sep. 18, 1998, http.//www.flatbacktech.com/, pp. 2 pp. Total.
"USA Vuella Expands Offerings," Bike Pulse Bicycle Product and Industry Trends, Sep. 1998, vol. 2, No. , 9 pp. 28–29.
Unnumbered, two–sided color magazine page, illustrating two bicycle company advertisements: 1) Koobi "Splltilt Technology" bicycle saddle; 2) Specialized "Rockhopper A1 Comp., "Sep. 1999 Mountainbike Magazine.
Selle ITALIA 1999 product brochure: 6–page foldout Illustrating a variety of bicycle saddles; ProNet Incororated—Seattle, Washington distributer.
Photocopy of Specialized Bicycle product brochure, "Saddles"; cover page and pp. 74–77.
Serfase "Cycling Products 2000"; photocopy, 9–page product brochure illustrating a variety of Serfas bicycle saddles.
Selle San Marco, "2000 Collezione"; five–language, multi–manufacturer, 16–page product brochure (includes foldout front and back covers) for bicycle saddles.
Aitgo, TM. (Stuttgart, Germany) bicycle saddle product brochure (three–page unnumbered, photocopy) by Hindslte, TM. Sports Scottsdale, Arizona distributor.

BICYCLE SADDLE WITH CUT OUT

REFERENCE TO RELATED APPLICATION

This application is a continuation of prior application Ser. No. 09/452,546, filed Dec. 1, 1999 now U.S. Pat. No. 6,106,059, which was a continuation of prior application Ser. No. 09/172,738, filed Oct. 14, 1998, now abandoned, and which claimed priority from U.S. provisional patent application No. 60/062,979 filed Oct. 18, 1997.

FIELD OF THE INVENTION

The present invention relates to the field of bicycle seats, and more specifically, to anatomically correct support provided by a seat.

BACKGROUND

Bicycle seats, or saddles, have traditionally been designed with a convex profile such that they fit between the body's ischial tuberosities ("sit bones") with a small protrusion tucked up in the crotch.

Prior bicycle seats cause saddle-related numbness in both male and female riders. This numbness results from pressure on perineal areas which can actually increase as riders sink farther into traditional seats.

In female riders, the arch of the pubic symphysis is shallow. Sitting on traditional bicycle seats can compress tender genital tissues against the seat causing irritation to the genitals.

In male riders, the crotch area of the body contains nerves and pudendal arteries leading to the penis. These arteries carry blood flow that enables erection. Sitting on traditional bicycle seat can increase the pressure in the pudendal arteries causing a decrease in blood flow. This decrease in blood flow may cause numbness potentially leading to impotency in certain male bicycle riders. Therefore, it is desirable to have a seat with a construction that is designed to eliminate these problems.

SUMMARY OF THE INVENTION

The present invention pertains to a bicycle seat with a base having a front which broadens towards a rear having a notched groove. The base includes a rigid frame and a first layer connected to the frame. A connector is attached to the base for connecting the seat to the bicycle.

Another aspect of the present invention includes a second layer of resilient material located between the frame and the first layer that is denser than the first layer material to prevent the rider from bottoming out on the frame.

Yet another aspect of the present invention includes a groove with dimensions approximately equal to the dimensions of a human body ischial tuberosities such that pressure is reduced on the internal pudendal arteries.

Other features and advantages of the present invention will be apparent from the accompanying drawings and from the detailed description that follows.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A bicycle seat with cut out is described. The seat is designed to reduce the side effects attributable to seat pressure on the crotch area of a bicycle rider. The seat reduces pressure on the internal pudendal arteries and prevents decreased blood flow that may cause numbness and impotency in some male riders.

Figure 1:
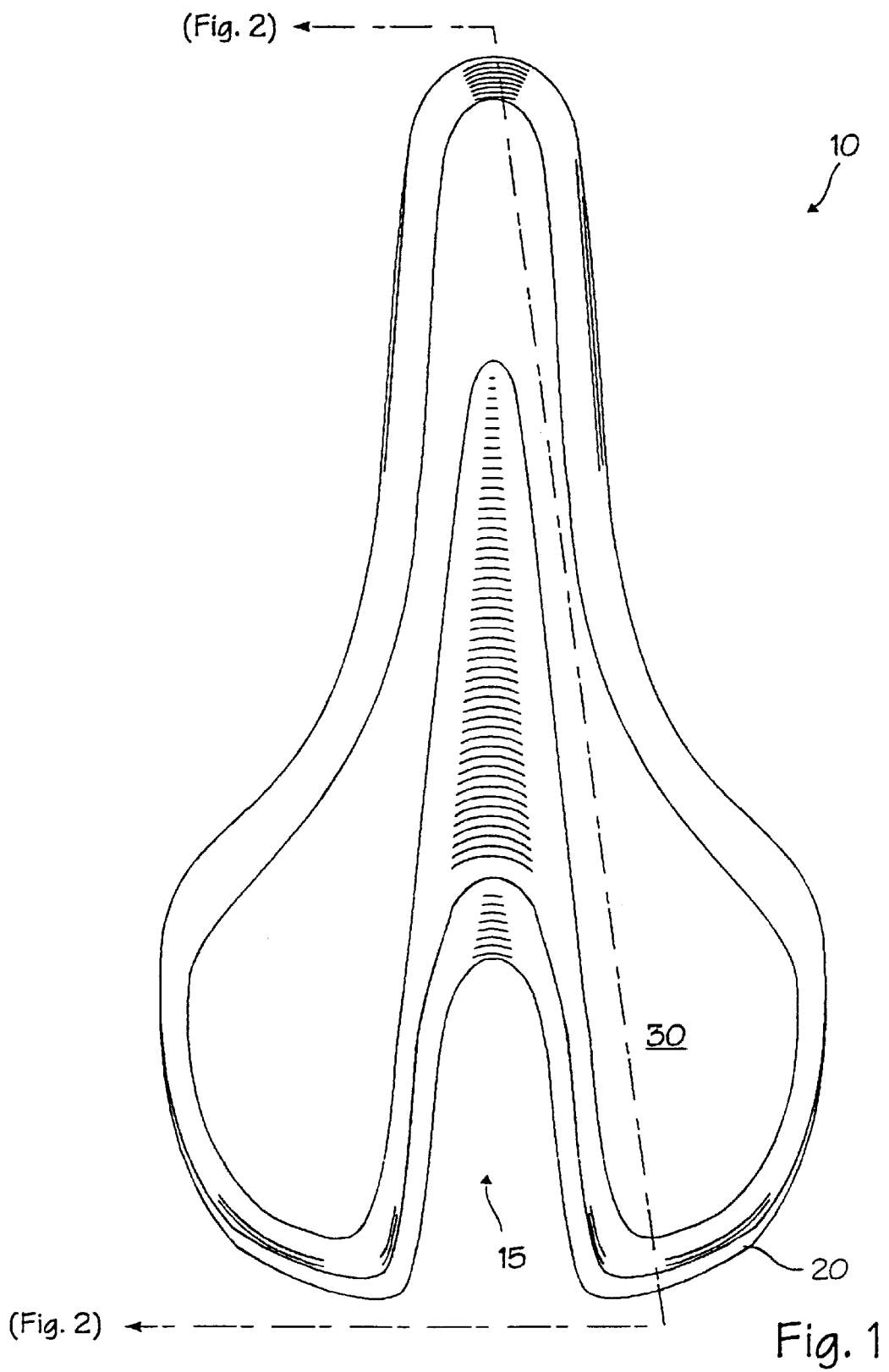
FIG. 1 shows a top perspective of a bicycle seat having a groove cut out of the rear of the seat.

FIG. 1 shows a top perspective of one embodiment of the bicycle seat having a triangular groove, or notch, 15 cut out of the rear of seat 10. The seat has a resilient material layer 30 on top of a frame 20. The configuration of groove 15 is designed to match the anatomy of the ischial tuberosities of the pelvis in an anatomically correct way to relieve pressure on the pudendal arteries. For one embodiment of the seat the interior of groove 15 is notched and beveled. A notch is defined as a V-shaped cut that begins at the rear of the seat and narrows as it extends towards the front of seat 10. Beveled is defined as an angle formed by the top surface of the seat and the interior surface of the groove that is less than 90 degrees. For example, groove 15 measures approximately 2¼" wide at its rear, extends up to 10" into seat 10, and is beveled at approximately a 60 degree angle. These dimensions can be varied to accommodate different sized pelvic structures and intended uses. In another embodiment, groove opening 15 is bridged such that a rigid material spans and connects one side of groove opening 15 to the other side.

In other embodiments, the opening of groove 15 can be in the form of a different shape such as a rectangle, ellipse, or hyperbola.

Figure 2:
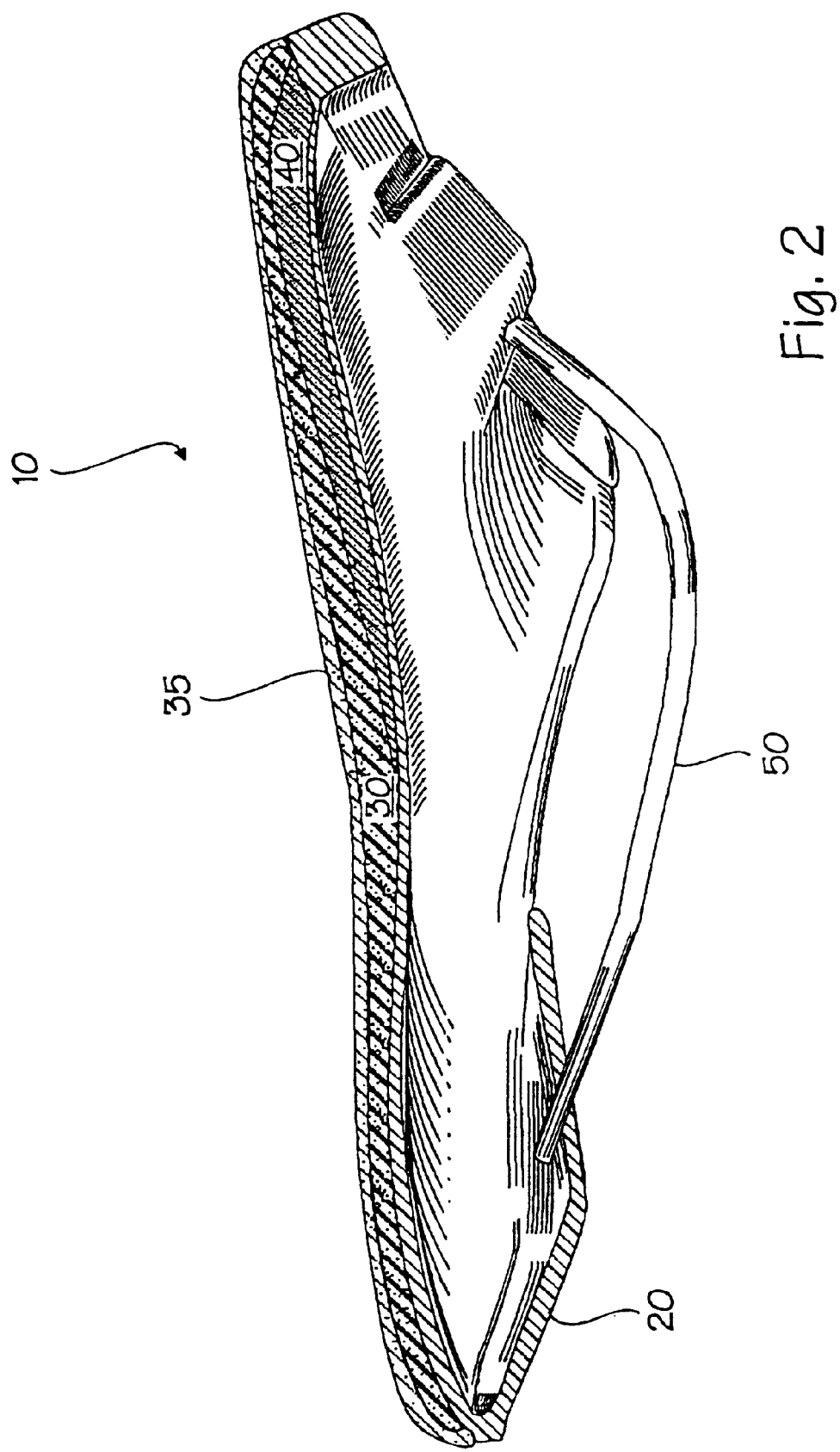
FIG. 2 shows a cross-section of a bicycle seat that implements one embodiment of the present invention.

FIG. 2 shows a cross-section of one embodiment of seat 10. Frame 20 is constructed from plastic or another rigid material such as titanium or aluminum. A connecting bar 50 is attached to the underside of frame 20 to attach seat 10 to a bicycle seat post (not shown). Resilient layer 30 is on top of frame 20. As is known to those skilled in the art, layer 30 can be constructed from many resilient or elastic materials such as a polyurethane foam or gel.

In another embodiment, another resilient material layer 40 is between frame 20 and layer 30. Layer 40 is bonded to layer 30. Layer 40 consists of a high resiliency polyurethane foam. The foam has a durometer reading in the range of 40–50 durometer units. In other embodiments, layers 30 and 40 can be constructed from other resilient or elastic materials that are well known to those skilled in the art.

In another embodiment, layer 40 is constructed from a material that is denser than layer 30 to prevent the rider from bottoming out on frame 20. Bottoming out is a condition that occurs when the layers have fully compressed under weight. This results in the rider in effect sitting on the frame, not supported by the layers.

An alternative embodiment of seat 10 contains only layer 30 over frame 20. Yet another embodiment of seat 10 contains only layer 40 over frame 20.

The typical thickness of layers 30 and 40 can vary from approximately 1/16" to 1". An outer layer 35 is used to cover layers 30 and 40 and attaches to frame 20. Outer layer 35 is a synthetic material. For other embodiments, outer layer 35 may be constructed from other materials such as leather or fabric.

Figure 3:
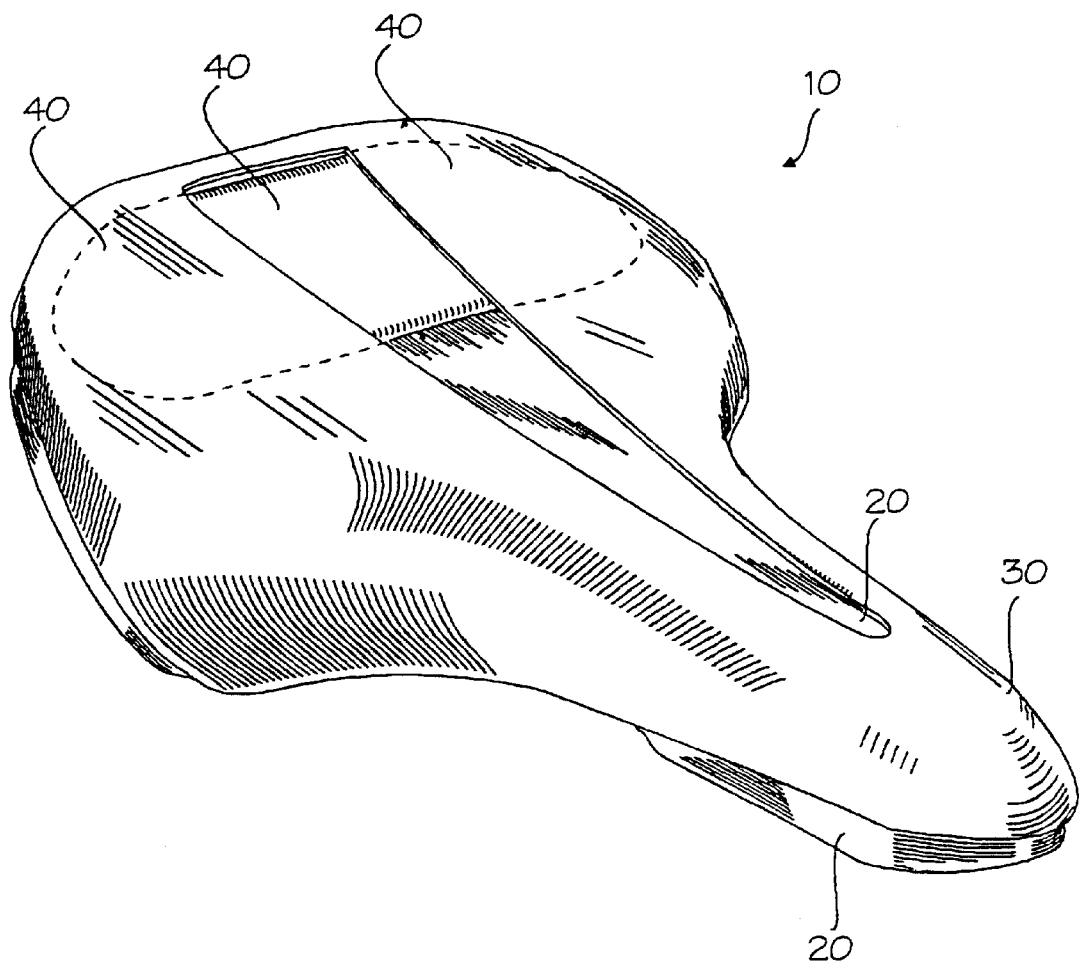
FIG. 3 shows an alternate embodiment of the seat having a cavity cut out of a foam layer.

FIG. 3 shows an alternate embodiment of seat 10 having a triangular cavity cut out of layer 30. In other embodiments, the cavity can be different shapes such as a rectangle, ellipse, or hyperbola. The cavity can also be cut out of either, or both, layers 30, 40 and frame 20. In other embodiments the cavity is also cut out of the rear of seat 10 forming a groove as described above.

Figure 4:
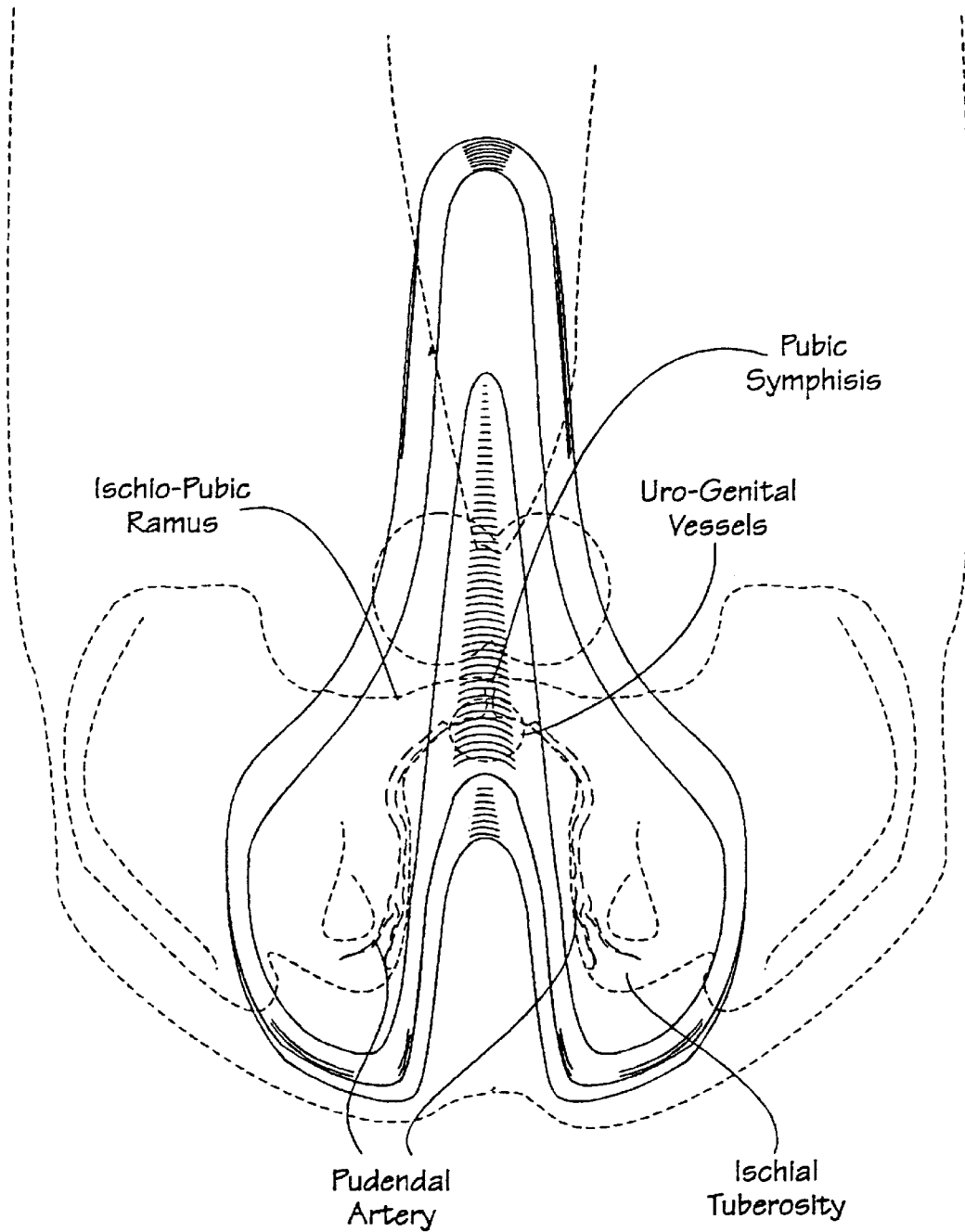
FIG. 4 shows a top view of the ischial tuberosities in relation to one embodiment of the seat cut out.
Figure 5:
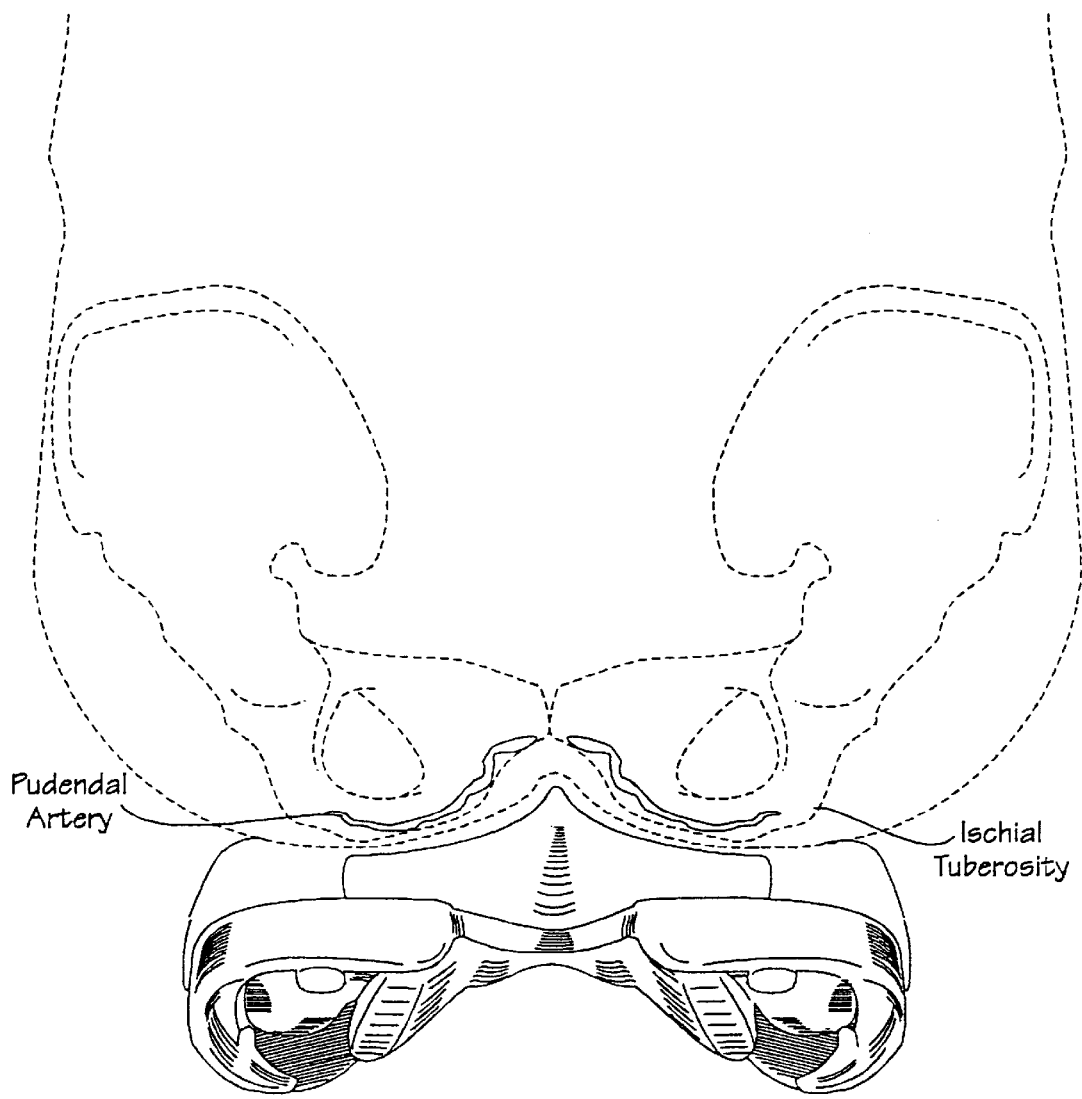
FIG. 5 shows a cross section of the ischial tuberosities in relation to a rear view of embodiment of the seat cut out.

The configuration of the cut out is designed to match the anatomy of the ischial tuberosities of the pelvis in an anatomically correct way to relieve pressure from the pudendal arteries. The distance between the ischial tuberosities of an adult varies between approximately 2" to 4½". The cut out is large enough so that there is space underneath the pelvis between the ischial tuberosities along the length of the pudendal arteries. In another embodiment, the top surface of seat 10 is approximately flat. FIG. 4 shows a top view of the ischial tuberosities in relation to one embodiment of the cut out. FIG. 5 shows a cross sectional view of the ischial tuberosities in relation to a rear view of one embodiment of the cut out.

Figure 6:
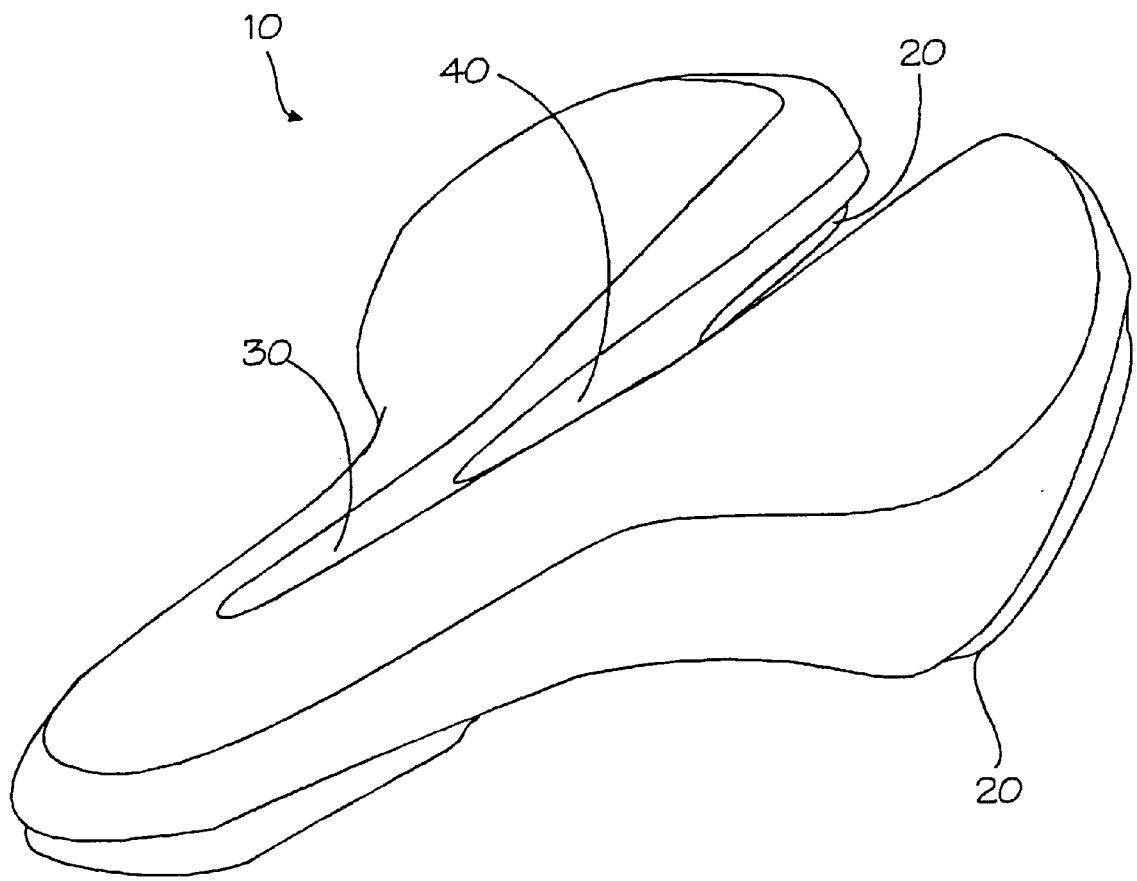
FIG. 6 shows an alternate embodiment of the seat having a beveled groove.

FIG. 6 shows an alternate embodiment of seat 10 where the groove in layers 30 and 40 extends forward further than the groove in frame 20. The groove is notched with each layer beveled to a greater extent than the layer beneath it such that layer 40 extends farther forward than frame 20 and layer 30 extents farther forward than layer 40. This configuration allows for space for the scrotum while providing uniform support of the user through the entire range of foam layer compression. As the beveled layers 30 and 40 compress, the user's body comes in surface contact with more of the seat thereby increasing the support to the user.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. An ergonomic bicycle seat, comprising:
   a rigid one-piece frame defining a front, a back, a first outer side and a second outer side, said frame generally widening from front to back, said frame defining a length, said frame defining a cutout extending forward from a rear edge of said back of said frame;
   a resilient material secured to said frame, said resilient material defining an upper surface;
   a central groove at least partially defined by inwardly facing sides of said resilient material, said groove being positioned roughly in the longitudinal center of said seat, said groove having a leading edge defined by said resilient material and extending rearward to approximately said back of said seat, said leading edge extending forward of said cutout, said groove having a width of approximately 2 to 4½ inches at said upper surface at said back of said seat;
   wherein said groove and said cutout cooperate to define an open space for relieving pressure on the pudendal arteries of a seat occupant.

2. The seat of claim 1, wherein said groove is generally V-shaped.

3. The seat of claim 1, wherein said frame comprises a single piece of one of plastic, titanium and aluminum.

4. The seat of claim 3, wherein said seat is substantially flat.

5. The seat of claim 3, further comprising:
   a first layer connected to the frame;
   a second layer disposed between the first layer and the frame, wherein the first layer is constructed of a resilient material, and the second layer is constructed of a resilient material that is denser than the first layer resilient material.

6. The seat of claim 5, wherein the said inwardly facing sides of said resilient material are beveled.

7. The seat of claim 5, wherein the seat is substantially flat.

8. The seat of claim 1, wherein said seat is substantially flat.

9. An ergonomic bicycle seat, comprising:
   a one-piece rigid frame defining a front, a back, a first outer side and a second outer side, said frame including a narrower portion adopted to extend through the crotch of a seat occupant and a wider portion adapted to support the ischisial tuberosities of a seat occupant, said frame defining a length and a cutout extending forward from a rear edge of said back of said frame;
   a resilient material secured to said frame, said resilient material defining an upper surface; and
   a central groove at least partially defined by inwardly facing sides of said resilient material which are beveled outward toward said upper surface, said groove extending to form a scrotum channel positioned roughly in the longitudinal center of said seat, said groove having a leading edge defined by said resilient material and extending rearward to said back of said seat, said leading edge extending forward of said cutout, said groove having a width of approximately 2 to 4½ inches at said upper surface at said back of said seat and narrowing as said groove extends toward said scrotum channel;
   wherein said groove and said cutout cooperate to define an open space for relieving pressure on the pudendal arteries of a seat occupant.

10. The seat of claim 9, wherein said frame comprises a single piece of one of plastic, titanium and aluminum.

11. The seat of claim 10, wherein said seat is substantially flat.

12. The seat of claim 11, further comprising:
    a first layer connected to the frame;
    a second layer disposed between the first layer and the frame, wherein the first layer is constructed of a resilient material, and the second layer is constructed of a resilient material that is denser than the first layer resilient material.

13. The seat of claim 10, wherein said seat is substantially flat.

14. An ergonomic bicycle seat, comprising:
    a rigid one-piece frame defining a front, a back, a first outer side and a second outer side, said frame generally widening from front to back, said frame defining a length, said frame defining a cutout extending forward from a rear edge of said back of said frame;
    a resilient material secured to said frame, said resilient material defining an upper surface;
    a central groove at least partially defined by inwardly facing sides of said resilient material, said groove being positioned roughly in the longitudinal center of said seat, said groove extending to form a scrotum channel positioned roughly in the longitudinal center of said seat, said groove having a leading edge defined by said resilient material and extending rearward to said back of said seat, said leading edge extending forward of said cutout, said groove having a width of approximately 2 to 4½ inches at said upper surface at said back of said seat and having a narrower width at said scrotum channel;

wherein said groove and said cutout cooperate to define an open space for relieving pressure on the pudendal arteries of a seat occupant.

15. The seat of claim 14, wherein said groove is generally V-shaped.

16. The seat of claim 14, wherein said frame comprises a single piece of one of plastic, titanium and aluminum.

17. The seat of claim 16, wherein said seat is substantially flat.

18. The seat of claim 14, wherein said seat is substantially flat.

19. The seat of claim 18, further comprising:

a first layer connected to the frame;

a second layer disposed between the first layer and the frame, wherein the first layer is constructed of a resilient material, and the second layer is constructed of a resilient material that is denser than the first layer resilient material.

* * * * *